United States Patent [19]
Abthoff et al.

[11] 4,150,954
[45] Apr. 24, 1979

[54] SPLIT GAS GENERATOR

[75] Inventors: Jöerg Abthoff, Pluederhausen; Hans-Dieter Schuster, Schorndorf; Rolf Gabler, Waiblingen, all of Fed. Rep. of Germany Germany

[73] Assignee: Daimler-Benz Aktiengesellschaft, Fed. Rep. of Germany

[21] Appl. No.: 852,032

[22] Filed: Nov. 16, 1977

[30] Foreign Application Priority Data

Nov. 17, 1976 [DE] Fed. Rep. of Germany ....... 2652337

[51] Int. Cl.² .............................................. C10G 11/10
[52] U.S. Cl. .................................... 48/102 A; 48/107; 48/180 C; 123/3; 123/119 A; 422/192
[58] Field of Search ................ 48/180 C, 180 R, 107, 48/93, 102 A, 197 R, DIG. 8, 94, 96, 214 A; 23/288 R, 288 K; 123/3; 119 A; 261/98

[56] References Cited

U.S. PATENT DOCUMENTS

| | | | |
|---|---|---|---|
| 1,795,037 | 3/1931 | Portail | 48/107 |
| 2,792,337 | 5/1957 | Engel | 23/288 R |
| 3,828,736 | 8/1974 | Koch | 123/119 A |
| 3,871,838 | 3/1975 | Henkel et al. | 48/107 |
| 3,954,423 | 5/1976 | Hamper et al. | 48/107 |
| 3,966,430 | 6/1976 | Stephens | 48/180 R |

*Primary Examiner*—S. Leon Bashore
*Assistant Examiner*—George C. Yeung
*Attorney, Agent, or Firm*—Craig & Antonelli

[57] ABSTRACT

A split gas generator, especially for an air-compressing internal combustion engine of a motor vehicle, in which a catalyst supporting the split gas reaction is arranged in a container; the components of the split gas production flow through the catalyst in the longitudinal direction, while air-guide channels embedded in the catalyst are traversed by the exhaust gases and by the fresh air in a direction opposite to the direction of the split gas flow in the catalyst; the air-guide channels are in heat-transferring connection with the catalyst.

21 Claims, 1 Drawing Figure

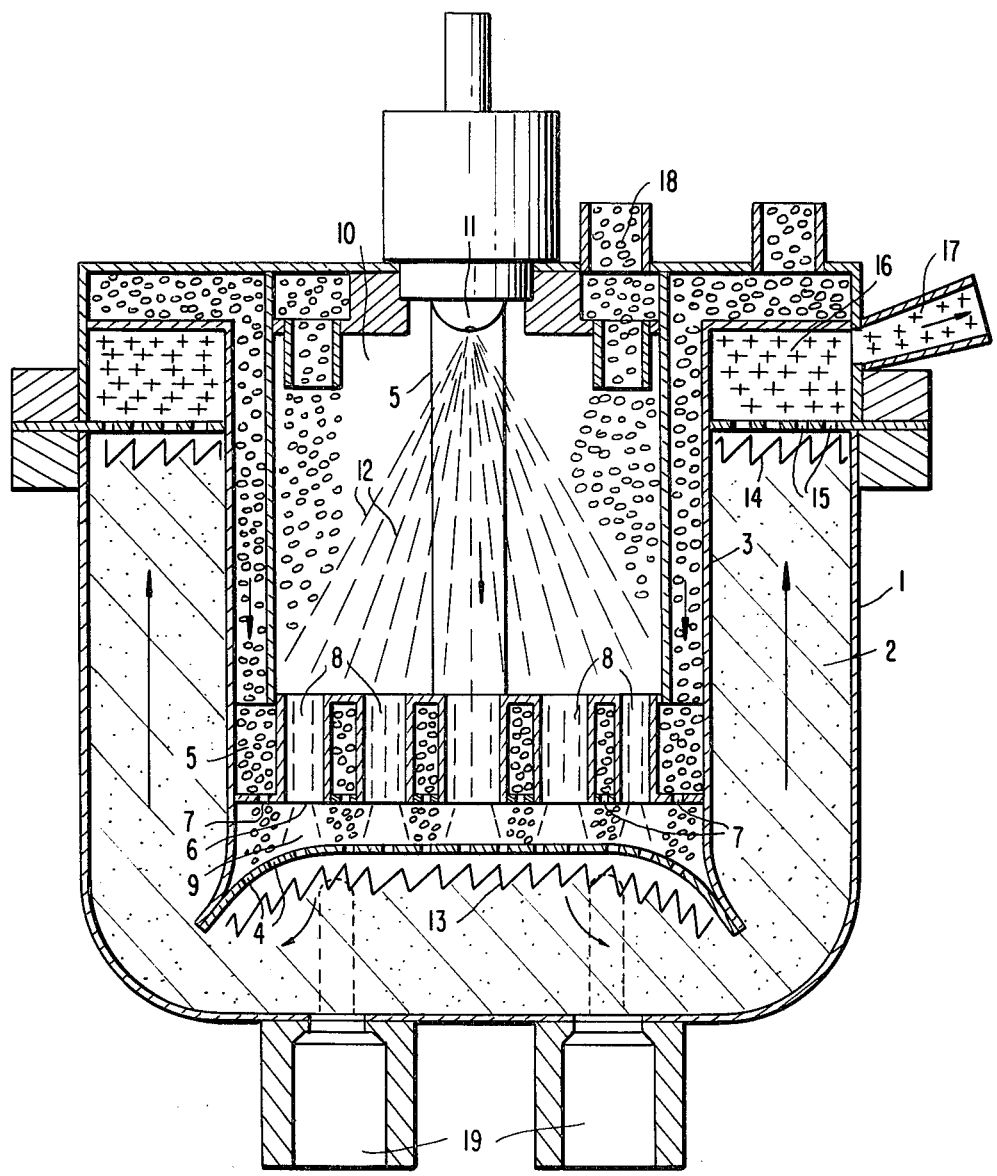

SPLIT GAS GENERATOR

The present invention relates to a split gas generator, especially for an air-compressing internal combustion engine for the reduction of the soot formation.

It is known that a fuel containing carbon and hydrogen, such as gasoline or diesel fuel, can be catalytically converted into split gas with the supply of primary air at an increased temperature, which split gas consists, inter alia, of methane, hydrogen, carbon monoxide and gaseous hydrocarbons, and that by the admixture of these gases or of a mixture of these gases to the sucked-in air/fuel mixture of an internal combustion engine, the combustion process will proceed with a considerably smaller soot component during the working stroke; the exhaust gases offer greater protection for the environment. Therebeyond, carburetors for the production of split gases are known in the prior art which, on the one hand, are sensitive to vibrations and, on the other, can hardly be accommodated in motor vehicles by reason of their space requirement.

It is the aim of the present invention to obtain economically with a correspondingly small split gas generator in a motor vehicle equipped in particular with an air-compressing internal combustion engine, the necessary gases for a combustion free of harmful components from diesel fuel by catalytic split carburetion with the use of the exhaust gas residual heat.

The underlying problems are solved according to the present invention in that a catalyst supporting the split gas reaction is arranged in a container, whereby the catalyst is traversed in the longitudinal direction by the reaction components of the split gas production, and in that air-guide channels are embedded in the catalyst which are traversed by the exhaust gas and the fresh air opposite the direction of the split gas flow in the catalyst and whereby the air-guide channels are in heat-conducting connection with the catalyst.

By the use of special catalysts of known type, a split gas, consisting of $H_2$, $CO$, $CO_2$, $CH_4$ and $H_2O$ can be obtained from an air/fuel mixture in conjunction with the exhaust gas residual heat. By the admixture of about 5% to about 25% of this split gas to the air quantity sucked-in by the internal combustion engine, a changed, more favorable combustion progress is attained than during normal combustion. The flame velocity is higher and a better through-burning takes place also in the so-called "squeeze zones" (interstice between a piston in the upper dead-center position and the cylinder head wall of an internal combustion engine). This leads to a reduction of the soot formation. A similarly good combustion can be attained if the individual components of the split gas, such as, for example, $H_2$, $CO$ and gaseous hydrocarbons, are fed by themselves to the combustion space together with the air in approximately the same, aforementioned concentration.

For spatial reasons, inter alia, the catalyst may be arranged pot-shaped in the container and the air-guide channels may be disposed concentrically inside of the catalyst.

The supplied air fed to the split gas flow (exhaust gas + air) on the inside of the container preferably in the counter-flow principle will be rapidly brought to the operating temperature by the exhaust gas residual heat respectively by the heat supply on the side of the catalyst, whereby the temperature rise can be accelerated by the supply of predominantly primary air.

The catalyst may consist of a catalyst carrier, such as, for example, of a sintered, perforated brick or brick-like material, or of a granulated material fill.

Additionally, a spray-and evaporation-chamber for fuel may be arranged concentrically to the air-guide channels. The sprayed-in and evaporated fuel is thereby caused to distribute itself during the passage through the spray-chamber bottom areally over a large number of openings (connecting channels) arranged between air-guide channels, which combine with the air-guide channels into a mixing chamber.

As a result of the large number of air-guide and connecting channels which extend areally over the entire spray- and evaporation-chamber bottom and which terminate in the mixing chamber, the sprayed-in (injected) and evaporated fuel is mixed rapidly and intensively with the supplied air. The mixing chamber is provided with a perforated bottom.

Additionally, a neutral porous wall may be provided in the transition from the mixing chamber to the catalyst and/or in the transition from the catalyst into a split-gas collecting chamber arranged on the outlet side, which wall may consist, for example, of a sintered, perforated brick or brick-like material provided with fine channels or of a granulate material fill of any conventional type.

The catalyst, in its turn, is separated from the split gas collecting chamber by a perforated cover. The split gas collecting chamber can be connected directly with the suction pipe of the internal combustion engine by way of a line; however, it may also be in communication directly with the respective combustion spaces of the internal combustion engine by way of controlled valves.

For a cold start, glow pins may be provided in the catalyst. These glow pins may be connected in parallel, for example, with the preliminary heating system of the air-compressing internal combustion engine.

Finally, a fresh air inlet adapted to be closed or regulated may be provided in the spray- and evaporating-chamber. This fresh air inlet serves especially for the rapid rise of the temperature to the operating temperature as a result of a more rapid progress of the exothermic reaction process so that already during the starting or during the warm-up of the internal combustion engine, exhaust gases can be obtained which protect the environment.

Accordingly, it is an object of the present invention to provide a split gas generator especially for an air-compressing internal combustion engine which avoids by simple means the aforementioned shortcomings and drawbacks encountered in the prior art.

Another object of the present invention resides in a split gas generator, especially for an air-compressing internal combustion engine of a motor vehicle, which permits a ready accommodation thereof in motor vehicles.

A further object of the present invention resides in a split gas generator of the type described above which has a relatively slight space requirement and is relatively insensitive to vibrations, thereby favoring its installation into motor vehicles.

Still a further object of the present invention resides in a split gas generator, especially for an air-compressing internal combustion engine of a motor vehicle, which enables the generation of the necessary split gases for a combustion low in harmful components by economic means utilizing a catalytic split carburetion.

A still further object of the present invention resides in a split gas generator which utilizes the residual heat of the exhaust gases to enhance the catalytic generation of the gases necessary for a combustion of an air-compressing internal combustion engine which has a particularly low soot formation.

Another object of the present invention resides in a split gas generator of the type described above which causes a more favorable combustion process resulting in a reduction of the soot formation.

These and other objects, features and advantages of the present invention will become more apparent from the following description when taken in connection with the accompanying drawing which shows, for purposes of illustration only, one embodiment in accordance with the present invention, and wherein:

The single FIGURE is a cross-sectional view through a split gas generator in accordance with the present invention.

Referring now to the single FIGURE of the drawing, the split gas generator of the present invention consists of a container 1, in which is arranged a pot-shaped catalyst 2 of any conventional type. The catalyst 2 may consist, for example, of a porous catalyst carrier containing a catalyzing substance or of a corresponding fill of granulated material. Separated from the catalyst 2 by a wall 3 having a perforated bottom 4, air-guide channels 5 are arranged on the pot-shaped hollow space thereof, which form at a distance to the perforated bottom 4 an intermediate bottom 6 of a large number of air outlet openings 7 and connecting channels 8. As clearly seen in the drawing, in the embodiment illustrated, the air-guide channels 5 are contiguous with the inner wall 3 of the pot-shaped catalyst chamber. The pot-shaped hollow space on the inside of the catalyst is subdivided by the intermediate bottom 6 into a mixing chamber 9 and into a spray- and evaporation-chamber 10.

Fuel (diesel fuel) is injected into the spray- and evaporation chamber 10 through a nozzle 11 provided in the spray- and evaporation-chamber 10. The finely evaporated fuel particles 12 reach the mixing chamber 9 through the connecting channels 8 of the intermediate bottom 6, where an intensive mixing with the supply air flowing out of the air outlet openings 7 takes place. This outflowing supply air may consist partially of fresh air and partially of exhaust gases which are admitted through inlet 22. The air/fuel mixture forming in the mixing chamber 9 flows into the catalyst 2 through the perforated bottom 4 and through a neutral porous layer 13 (for example, a granulated material fill of suitable, known type). While flowing through the catalyst, an exothermic reaction takes place, as a result of which split gas is produced which flows through a neutral porous layer 14 arranged at the catalyst outlet and through a perforated wall 15 closing off the catalyst into a split gas common or collecting chamber 16. The split gas collecting chamber 16 is connected with a suction pipe (not shown) of the internal combustion engine by way of a line 17, eventually under interconnection of a throttle valve (also not shown). The line 17, however, may also lead directly to the individual cylinders of the internal combustion engine, whereby the inlet is correspondingly controlled by way of a control member.

For the cold start and for the warm-up drive to the operating temperature, a fresh air inlet 18 adapted to be closed or regulated is provided in the spray- and evaporation-chamber 10, whereas glow pins 19 are arranged in the catalyst 2. The glow pins 19 of conventional construction may be connected in parallel with the glow plugs of the air-compressing internal combustion engine and bring the catalyst to the starting temperature, i.e., to the temperature at which the action of the catalyst leads to a considerable reaction. The exothermic reaction in the catalyst 2 is increased by fresh air so that the reforming temperature, i.e., the temperature is reached rapidly, at which methane, carbon monoxide and possibly hydrocarbons are obtained from a mixture of fuel and exhaust gases of the internal combustion engine, which contains, inter alia, water vapor and carbon oxides. The direction of flow of the supply air is preferably opposite to the direction of flow in the catalyst. After the catalyst temperature reaches a predetermined operating temperature, it is possible by closing the fresh air inlet port 18 to switch over the operation more and more to exhaust gas, as a result of which the exothermic reaction process can be caused to approach an endothermic process. Fresh air inlet port 18, as will be apparent to those skilled in the art, can be closed by means of any suitable, commercially available, schematically-shown closure mechanism 21 connected to the inlet port 18 through line 20. The operating temperature of the split gas generator is kept approximately contant by a progress which approaches an endothermic progress as nearly as possible.

While we have shown and described only one embodiment in accordance with the present invention, it is understood that the same is not limited thereto but is susceptible to many changes and modifications as known to those skilled in the art. Thus, instead of being contiguous with the inner side of inner wall 3, as shown in the drawings, air-guide channels 5 can also be embedded in the catalyst, as already mentioned above. We therefore do not wish to be limited to the details shown and described herein but intend to cover all such changes and modifications as are encompassed by the scope of the appended claims.

We claim:

1. A split-gas generator for catalytically converting fuel for a combustion engine comprising:
   (a) a container having outer and inner wall means defining between them a catalyst chamber for containing a conversion catalyst extending longitudinally of said container, said inner wall defining an inner, spray and evaporation chamber surrounded by said catalyst chamber and communicating with said catalyst chamber;
   (b) air-guide means contiguous with said catalyst chamber extending longitudinally of said container and communicating with said catalyst chamber;
   (c) spray and evaporating means for introducing fuel into one end of said inner chamber;
   (d) first inlet means connected to said air-guide channel means for introducing air or air and exhaust gas from a combustion engine into said air-guide channel means;
   (e) means for mixing evaporated fuel with said air or said air and exhaust gas at the other end of said inner chamber to form a mixture, said mixing means having means for introducing said mixture into said catalyst chamber; and
   (f) means defining a split gas collection chamber communicating with the catalyst chamber for collecting split gas.

2. A split gas generator according to claim 1, wherein the split gas generator is for an air-compressing internal combustion engine to reduce the soot formation thereof.

3. A split gas generator according to claim 1, wherein the catalyst chamber is pot-shaped and the air-guide channel means are located substantially concentrically inside the inner wall means.

4. A split gas generator according to claim 3, wherein the spray-and evaporation-chamber is substantially concentric to the air-guide channel means.

5. A split gas generator according to claim 4, wherein the inner chamber terminates in a plurality of the connecting channel means adjacent the air-guide channel means, said connecting channel means and said air-guide channel means communicating with a mixing chamber which communicates with the catalyst chamber.

6. A split gas generator according to claim 5, wherein a first neutral porous layer is provided between the mixing chamber and the catalyst.

7. A split gas generator according to claim 5, wherein a second neutral porous layer is provided between the catalyst and the split gas collecting chamber, said split gas collecting chamber having exit port means for removing split gas.

8. A split gas generator according to claim 5, wherein glow pin means are embedded in the catalyst.

9. A split gas generator according to claim 8, wherein second inlet means is connected to the spray- and evaporation-chamber for admitting fresh air to said spray- and evaporation-chamber.

10. A split gas generator according to claim 9, wherein means for controlling the fresh air inlet means to open and close said fresh air inlet means are connected thereto.

11. A split gas generator according to claim 9, wherein a first neutral porous layer is provided between the mixing chamber and the catalyst.

12. A split gas generator according to claim 11, wherein a second neutral porous layer is provided between the catalyst and the split gas collecting chamber.

13. A split gas generator according to claim 9, wherein the air-guide channel means are contiguous with the inside wall of the catalyst chamber.

14. A split gas generator according to claim 1, wherein the spray- and evaporation-chamber means for fuel is arranged substantially concentrically to the air-guide channel means.

15. A split gas generator according to claim 14, wherein the inner chamber terminates in a plurality of connecting channel means adjacent the air-guide channel means, said connecting channel means and said air-guide channel means communicating with a mixing chamber which communicates with the catalyst chamber.

16. A split gas generator according to claim 15, wherein a first neutral porous layer is provided between the mixing chamber and the catalyst.

17. A split gas generator according to claim 16, wherein a second neutral porous layer is provided between the catalyst and the split gas collecting chamber, said split gas collecting chamber having exit port means for removing split gas.

18. A split gas generator according to claim 1, wherein glow pin means are embedded in the catalyst.

19. A split gas generator according to claim 1, wherein second inlet means is connected to the spray- and evaporation-chamber for admitting fresh air to said spray- and evaporation-chamber.

20. A split gas generator according to claim 19, wherein means for controlling the fresh air inlet means to open and close said fresh air inlet means are connected thereto.

21. A split gas generator according to claim 1, wherein a neutral porous layer is provided between the catalyst and the split gas collecting chamber.

* * * * *

UNITED STATES PATENT AND TRADEMARK OFFICE
CERTIFICATE OF CORRECTION

PATENT NO. : 4,150,954
DATED : April 24, 1979
INVENTOR(S) : Jörg ABTHOFF, et al.

It is certified that error appears in the above-identified patent and that said Letters Patent are hereby corrected as shown below:

Title Page as it reads now:

[75] Inventors: Jöerg Abthoff, Pluederhausen;
Hans-Dieter Schuster, Schorndorf;
Rolf Gabler, Waiblingen, all of Fed. Rep. of Germany Germany Title Page as it should read:

[75] Inventors: Jörg Abthoff, Pluederhausen;
Hans-Dieter Schuster, Schorndorf;
Rolf Gabler, Waiblingen, all of Fed. Rep. of Germany Germany Signed and Sealed this Seventh Day of August 1979

[SEAL]

Attest:

*Attesting Officer*

LUTRELLE F. PARKER
*Acting Commissioner of Patents and Trademarks*